No. 617,251. Patented Jan. 3, 1899.
E. H. ISRAEL.
PIPE CONNECTION.
(Application filed Jan. 28, 1898.)
(No Model.)
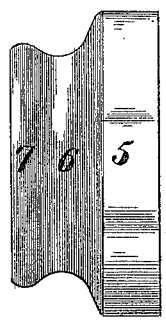
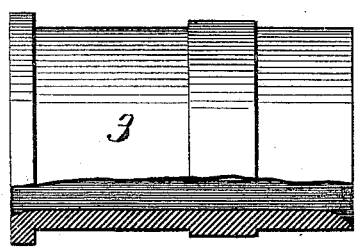
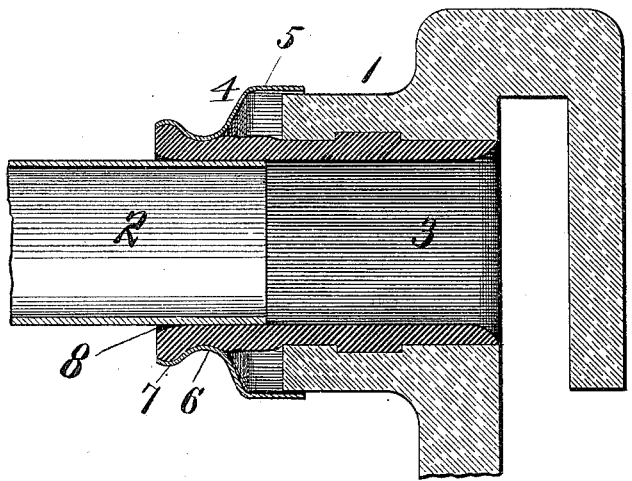
Attest:
E. S. Knight
Stanley Stoner
Inventor:
E. H. Israel,
by Knight Bro
Attys.

UNITED STATES PATENT OFFICE.

EARL H. ISRAEL, OF ST. LOUIS, MISSOURI, ASSIGNOR TO THE L. M. RUMSEY MANUFACTURING COMPANY, OF SAME PLACE.

PIPE CONNECTION.

SPECIFICATION forming part of Letters Patent No. 617,251, dated January 3, 1899.

Application filed January 28, 1898. Serial No. 668,267. (No model.)

*To all whom it may concern:*

Be it known that I, EARL H. ISRAEL, a citizen of the United States, residing in the city of St. Louis, in the State of Missouri, have invented a certain new and useful Improvement in Pipe Connections, of which the following is a full, clear, and exact description, reference being had to the accompanying drawings, forming part of this specification.

My invention relates to an improved means for joining a flexible connection to a pipe and is well adapted for use in connecting supply-pipes to the bowls of water-closets.

My invention consists in features of novelty hereinafter fully described, and pointed out in the claims.

Figure I is a side view of the collar that holds the flexible connection to the supply-pipe in a water-tight manner. Fig. II is a side view, partly in section, of the flexible connection. Fig. III is a detail sectional view.

1 represents part of the bowl of a water-closet, and 2 the lower end of the supply-pipe.

3 represents a flexible connection for joining the pipe to the bowl, this connection being in the form of a sleeve, preferably of rubber, the general shape of which and the operation of which is the same as in the Lynch patent, No. 465,617, dated December 22, 1891.

My invention relates to an improved means for holding the flexible connection onto the supply-pipe, whereby a water-tight fit is made between the two parts, while the pipe is capable of shifting longitudinally in the connection, so that in the event of the bowl settling or moving away from the pipe or any expansion or contraction of the connected parts the parts will not be broken or separated.

My invention further provides for an easy, quick, and reliable joining of the flexible connection to the pipe.

The invention consists in a collar 4, having a flange 5 to receive the horn of the bowl and having an inwardly-projecting bead 6 whose internal diameter is less than the external diameter of the flexible connection which it surrounds, so that it presses the flexible connection against the pipe. The bead 6 is rounded or circular in form, and the outer end of the collar has a flare 7, that receives the outer or upper end of the sleeve or connection 3 and permits the extreme outer end of the sleeve to flare slightly, as shown at 8, so as to provide for the easy slipping of the sleeve onto the pipe or of the pipe into the sleeve in putting the parts together. It will be understood that the bead 6 of the collar will compress the flexible sleeve at this point and that in yielding to this pressure the extreme outer end of the sleeve will fold into the swell 7 of the collar, thus providing the flare 8, the bead 6 serving also to bind the sleeve tight against the pipe and thus make a water-tight connection.

I claim as my invention—

1. A pipe connection consisting of a flexible sleeve adapted to fit over the end of a pipe, and a collar adapted to fit over the flexible sleeve and which has an inwardly-projecting bead whose internal diameter is less than the external diameter of the flexible connection so as to compress the latter and cause its outer end to flare open, substantially as set forth.

2. In a pipe connection, the combination of a flexible sleeve adapted to fit over the end of a pipe, and a collar adapted to fit over said sleeve; said collar having an inwardly-projecting bead, on one side of which is a flare 7 and on the other side of which is a flange 5, the internal diameter of the bead being of less diameter than the external diameter of the flexible connection so as to compress the latter and cause its outer end to flare open substantially as set forth.

EARL H. ISRAEL.

In presence of—
E. S. KNIGHT,
N. V. ALEXANDER.